US011281486B2

(12) United States Patent
Barabash et al.

(10) Patent No.: US 11,281,486 B2
(45) Date of Patent: *Mar. 22, 2022

(54) BANDWIDTH CONTROL IN MULTI-TENANT VIRTUAL NETWORKS

(71) Applicant: International Business Machines Corporation, Armonk, NY (US)

(72) Inventors: Katherine Barabash, Haifa (IL); Rami Cohen, Haifa (IL); Anna Levin, Haifa (IL); Liane Lewin-Eytan, Binyamina (IL); Eran Raichstein, Yokneam Ilit (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,313

(22) Filed: Oct. 4, 2019

(65) Prior Publication Data

US 2020/0034184 A1 Jan. 30, 2020

Related U.S. Application Data

(60) Continuation of application No. 15/837,202, filed on Dec. 11, 2017, now Pat. No. 10,481,939, which is a
(Continued)

(51) Int. Cl.
*G06F 9/455* (2018.01)
*H04L 47/24* (2022.01)
(Continued)

(52) U.S. Cl.
CPC ...... *G06F 9/45558* (2013.01); *H04L 41/5003* (2013.01); *H04L 47/10* (2013.01);
(Continued)

(58) Field of Classification Search
CPC ............ H04L 41/5003; H04L 41/5009; H04L 41/5019; H04L 41/5022; H04L 47/10;
(Continued)

(56) References Cited

U.S. PATENT DOCUMENTS 7,257,084 B1 * 8/2007 Srinivasan .............. H04L 45/00
370/235
7,821,929 B2 10/2010 DelRegno et al.
(Continued)

FOREIGN PATENT DOCUMENTS

WO 2007116411 A1 10/2007

OTHER PUBLICATIONS

Babiarz et al., "Configuration Guidelines for DiffServ Service Classes," Aug. 2006, pp. 1-57, Copyright (c) The Internet Scociety (2006), retrieved from https://tools.ietf.org/html/rfc4594.
(Continued)

*Primary Examiner* — Jeong S Park
(74) *Attorney, Agent, or Firm* — Nathan M. Rau (57) ABSTRACT

Machines, systems and methods for managing quality of service (QoS) in a multi-tenant virtualized computing environment, the method comprising: collecting transmission rate statistics associated with data communicated in a virtual network, wherein at least one virtual switch monitors communications initiated by at least a virtual machine (VM) executed on a host machine serviced by the virtual switch; determining, by way of the virtual switch, profile parameters associated with a first communication initiated by the VM belonging to at least a first group, wherein a connection request is submitted by the virtual switch to a traffic controller to assist in establishing the first communication; classifying the connection request for establishing the first communication according to the profile parameters associated with the first communication; determining a first aggre-
(Continued)

gated transmission rate associated with the VM that initiated the first communication based on the classifying.

18 Claims, 6 Drawing Sheets

Related U.S. Application Data division of application No. 13/953,766, filed on Jul. 30, 2013, now Pat. No. 9,864,620.

(51) Int. Cl.
*H04L 47/10* (2022.01)
*H04L 41/5003* (2022.01)
*H04L 47/2425* (2022.01)
*H04L 41/5009* (2022.01)

(52) U.S. Cl.
CPC .......... *H04L 47/24* (2013.01); *G06F 9/45533* (2013.01); *G06F 2009/45595* (2013.01); *H04L 41/5009* (2013.01); *H04L 47/2425* (2013.01)

(58) Field of Classification Search
CPC . H04L 47/24; G06F 9/45558; G06F 9/45533; G06F 2009/45595
See application file for complete search history.

(56) References Cited

U.S. PATENT DOCUMENTS

| | | | |
|---|---|---|---|
| 9,864,620 B2* | 1/2018 | Barabash | H04L 47/10 |
| 10,481,939 B2* | 11/2019 | Barabash | H04L 47/10 |
| 2002/0118644 A1 | 8/2002 | Moir | |
| 2005/0113104 A1 | 5/2005 | Chen et al. | |
| 2007/0027975 A1 | 2/2007 | Tai et al. | |
| 2008/0215749 A1* | 9/2008 | Bala | H04L 12/66 709/233 |
| 2010/0027420 A1* | 2/2010 | Smith | H04L 47/70 370/235 |
| 2011/0007746 A1* | 1/2011 | Mudigonda | G06F 9/45558 370/395.21 |
| 2011/0035248 A1 | 2/2011 | Juillard | |
| 2012/0054624 A1 | 3/2012 | Owens, Jr. et al. | |
| 2012/0290695 A1 | 11/2012 | Barabash | |
| 2012/0291024 A1 | 11/2012 | Barabash | |
| 2013/0003538 A1 | 1/2013 | Greenberg et al. | |
| 2013/0074066 A1* | 3/2013 | Sanzgiri | H04L 41/0893 718/1 |
| 2013/0091261 A1 | 4/2013 | Barabash | |
| 2013/0275568 A1* | 10/2013 | Nguyen | H04L 41/0806 709/223 |
| 2013/0346613 A1 | 12/2013 | Tarasuk-Levin et al. | |
| 2014/0007097 A1 | 1/2014 | Chin et al. | |
| 2014/0314139 A1* | 10/2014 | Xia | H04N 19/136 375/240.02 |
| 2015/0156124 A1 | 6/2015 | Tsuji | |

OTHER PUBLICATIONS

Blake et al., "An Architecture for Differentiated Services," RFC 2475, Dec. 1998, pp. 1-36, Copyright (c) The Internet Scociety (1998), retrieved from https://tools.ietf.org/html/rfc2475.

Braun et al., "Virtual Private Network Architecture", CATI- Charging and Accounting Technology for the Internet, Institute of Computer Science and Applied Mathematics (IAM), University of Bern, Jan. 1999.

Candan et al., "At the Frontiers of Information and Software as Services," New Frontiers in Information and Software as Services, Lecture Notes in Business Information Processing vol. 74, 2011, pp. 283-300, Copyright Springer-Verlag Berlin Heidelberg 2011.

Cisco, "Cisco Virtualized Multi-Tenant Data Center Solution Design and Deployment Guide", Version 1.1, Chapter 2—Cisco VMDC Design and Deployment, Jun. 2010.

Duffield et al., "Resource Management With Hoses: Point-to-Cloud Services for Virtual Private Networks", IEEE/ACM Transactions on Networking, vol. 10, Issue 5, Oct. 2002, pp. 679-692.

Guo et al., "A Framework for Native Multi-Tenancy Application Development and Management," The 9th IEEE International Conference on E-Commerce Technology and the 4th IEEE International Conference on Enterprise Computing, Jul. 23-26, 2007, pp. 551-558, Tokyo, © 2007 IEEE.

Hayashi et al., "QoS-Ensured Network Resource Federation Driven by Bandwidth Brokers in Open Access Network Architecture", IEICE Transactions on Communications, vol. E95-B, No. 1, pp. 160-168, Jan. 2012.

Heinanen et al., "Assured Forwarding PHB Group," RFC 2597, Jun. 1999, pp. 1-11, Copyright (c) The Internet Scociety (1999), retrieved from https://tools.ietf.org/html/rfc2597.

IBM, "N/OS 7.2 Application Guide", First Edition, Apr. 2012. Can be found at : http://www-01.ibm.com/support/docview.wss?uid=isg3T7000538&aid=17.

Jacobson et al., "An Expedited Forwarding PHB," RFC 2598, Jun. 1999, pp. 1-11, Copyright (c) The Internet Scociety (1999), retrieved from https://tools.ietf.org/html/rfc2598.

Kanada et al., "Network-resource isolation for virtualization nodes", IEEE Symposium on Computers and Communications ISCC 2012, Jul. 2012, pp. 776-779.

Kwok et al., "Resource Calculations with Constraints, and Placement of Tenants and Instances for Multi-tenant SaaS Applications," Service-Orientated Computing—ICSOC 2008, Lecture Notes in Computer Science vol. 5364, 2008, pp. 633-648, © Springer-Verlag Berlin Heidelberg 2008.

List of IBM Patents or Patent Applications Treated as Related, Signed Oct. 4, 2019, 2 pages.

NETAPP, "Tech OnTap," Tech OnTap Newletter, Apr. 2014, https://communities.netapp.com/community/tech-ontap/.

Nichols et al., "Definition of the Differentiated Services Field (DS Field) in the IPv4 and IPv6 Headers," RFC 2474, Dec. 1998, pp. 1-20, Copyright (c) The Internet Scociety (1998), retrieved from https://tools.ietf.org/html/rfc2474.

Rajkumar et al., "A Resource Allocation Model for QoS Management," Proceedings of the 18th IEEE Real-Time Systems Symposium, Dec. 5, 1997, pp. 298-307, San Francisco, CA. D.O.I. 10.1109/REAL.1997.641291.

Shieh et al., "Sharing the Data Center Network", NSDI'11 Proceedings of the 8th USENIX conference on Networked systems design and implementation, 2011, pp. 23-23.

Smith et al., "Converged Enhanced Ethernet-Good for iSCSI SANs," NetApp White Paper, Oct. 2008, © 2008 NetApp.

Wen et al., "Enabling multi-tenancy and converged fabric for the cloud using QoS", Build Windows 2011, Sep. 15, 2011. Video can be found on-line at : http://channel9.msdn.com/Events/BUILD/BUI.

* cited by examiner

| VN unique ID | Policy group | Virtual IP address | Physical address | QoS Profiles IDs |
|---|---|---|---|---|
| VM1 | G1 | 192.168.1.1 | 13.0.0.5 | P1, P4, P5, P7, P8, P9 |
| VM2 | G2 | 192.168.3.1 | 13.0.0.5 | P2, P6, P7, P8, P9 |
| VM3 | G1 | 192.168.1.2 | 13.0.1.4 | P3, P4, P5, P7, P8, P9 |

*FIG. 4A*

| QoS Profile ID | QoS Profile | Bandwidth limit |
|---|---|---|
| P1 | (VN1, VM1) | 100 Mbps |
| P2 | (VN1, VM2) | 50 Mbps |
| P3 | (VN1, VM3) | 100 Mbps |
| P4 | (VN1, G1, G1, Gold) | 0.3 Gbps |
| P5 | (VN1, G1, G1, Silver) | 1 Gbps |
| P6 | (VN1, G2, G2, Gold) | 0.4 Gbps |
| P7 | (VN1, G1, G2, Premium) | 0.1 Gbps |
| P8 | (VN1, G1, G2, Platinum) | 0.2 Gbps |
| P9 | (VN1, G1, G2, Gold) | 0.5 Gbps |

BANDWIDTH CONTROL IN MULTI-TENANT VIRTUAL NETWORKS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to monitoring and controlling data transmission among nodes in a communications network and, more particularly, to controlling data transmission in a multi-tenant communications network bound by service level agreements (SLAs) that define Quality of Service (QoS) for a tenant's network. The QoS provides a tenant with the ability to manage different types of traffic over its network and provide them different QoS levels.

BACKGROUND

Hardware and software vendors offer platforms that allow a single physical machine (e.g., a host computer) to be partitioned into multiple independent network components (e.g., virtual machines). A virtual machine (VM) also referred to as an endpoint is typically software executed on a host machine (e.g., a node) in a communications network. A logical or virtual network connects a plurality of VMs, where different virtual networks may co-exist over the same infrastructure, comprising of networking equipment and physical hosts. A VM is generally associated with a single tenant over a virtual network implemented for that tenant. The virtual network is operated according to a set of service level agreements (SLAs) negotiated by the respective tenant. The SLA defines the level of service that will be provided to the tenant, which is characterized by the level of resources that may be utilized by the tenant's virtual network.

Multi-tenant virtual environments are configured to rely on an infrastructure in which resources are shared in order to achieve a higher profit margin by leveraging the economy of scale. Virtualized solutions that offer full consolidation of resources have been deployed to provide processing and storage resources, and more recently to deliver networking services. In a virtualized multi-tenant environment, it is desirable to provide different levels quality of service (QoS) for different tenants depending on the provisions of a tenant's SLA. To accomplish this, different types of traffic may be defined according to throughput and latency guarantees, such that services associated with a higher QoS, per a tenant's SLA, are given priority over a service associated with a lower QoS.

The above implementation ensures that a tenant with a more expensive or higher level subscription gets the proper priority and service. In the context of networking services, generally, network traffic and data communications bandwidth is managed using a best effort approach by simply transmitting data to the extent that bandwidth is available. Many protocols and mechanisms have been developed to provide different levels of QoS guarantees on top of the best effort approach. Such mechanisms can be configured to monitor and control the QoS either by controlling flow of communication between two network nodes, or by controlling transmission of data packets over a communications network based on the category or class to which the data packet belongs (i.e., flow QoS v. class QoS).

Currently, there is no enabling mechanism in a multi-tenant communications network for a tenant to differentiate between the traffic types associated with the tenant or to apply different services levels for the different types of traffic in the same manner as it is possible in a traditional single tenant environment. This is due to the fact that, at the network infrastructure level, data transmission generated or designated for the different virtual networks, potentially owned by different tenants, the same resources are used by the different virtual networks, where the virtual networks compete with each other for resource allocation.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for managing quality of service (QoS) in a multi-tenant virtualized computing environment are provided. In one embodiment, the method comprises collecting transmission rate statistics associated with data communicated in a virtual network, wherein at least one virtual switch monitors communications initiated by at least a virtual machine (VM) executed on a host machine serviced by the virtual switch; determining, by way of the virtual switch, profile parameters associated with a first communication initiated by the VM belonging to at least a first group, wherein a connection request is submitted by the virtual switch to a traffic controller to assist in establishing the first communication; classifying the connection request for establishing the first communication according to the profile parameters associated with the first communication; determining a first aggregated transmission rate associated with the VM that initiated the first communication based on the classifying; in response to determining that the first aggregated transmission rate is less than a first threshold, setting a first transmission rate for the first communication to a first rate, and in response to determining that the first aggregated transmission rate is above a second threshold, setting the transmission rate for the first communication to a second rate.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, it is desirable to enable tenants in a multi-tenant operating environment to manage traffic within their own virtual network. As provided in further detail below, a first level of management may be provided at the virtual network level to monitor and control allocation of resources between the tenants. When a QoS management mechanism is defined for the resources in a tenant's virtual network, the tenant is able to manage the tenant's individual portion of resources and further divide the tenant's portion of resources between the different traffic types supported in the tenant's virtual network.

To implement the above-noted collective virtual network dichotomy at the tenant level, a two-level solution may be implemented. The first level may be applied to monitor and control data communication among a plurality of tenants. The second level may be applied to monitor and control data traffic within a tenant's virtual network. In a virtual network, it may be desirable to manage data transmission at the VM level, between pairs of VMs, or between sets of VMs. Such a management may be based on respective profiles associated with the transmitting and receiving VMs, wherein a VM profile takes into account the VMs identity, the QoS requirements of the transmission and the tenant's SLA, classifying data traffic between individual VMs or groups of VMs for a tenant.

VMs allocated in the same virtual network, and having similar functionality or transmission characteristics may be logically grouped together based on a definable relationship. Such a group of VMs may be called a policy group. For throughput-oriented traffic at tenant level, SLAs may be defined both within a single policy group as well as between policy groups by setting several bandwidth limits and guarantees. For example, for each group G, the outgoing traffic of a VM may be restricted based on a policy associated with a VM connection rate limit, which represents the capacity of its connection to the virtual network. The outgoing traffic rate of a specific VM may also be set specifically for that VM (e.g., not as part of the VM's inclusion in a policy group).

For a group G, the inner group bandwidth limit, which is the aggregated traffic between the VMs within G, may be set at a maximum volume, or guaranteed at a specific volume. For a pair of groups G1-G2, the pair-wise groups' bandwidth limit, which is the aggregated traffic between the two groups may be set at a maximum volume, or guaranteed at a specific volume, depending on implementation.

Figure 1:
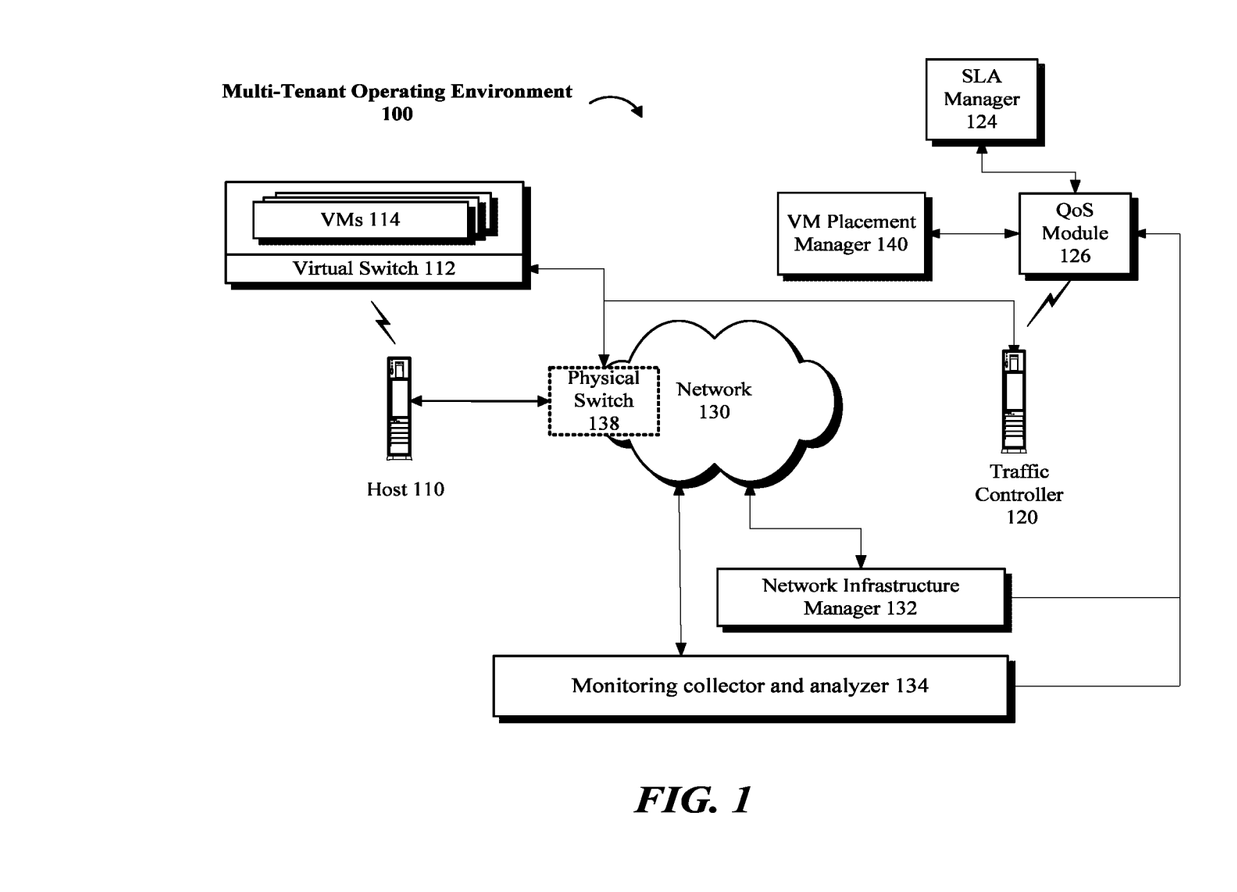
FIG. 1 illustrates an exemplary computing environment in accordance with one or more embodiments, wherein a plurality of VMs are implemented over one or more hosts in a multi-tenant communications network.

Referring to FIG. 1, a multi-tenant operating environment 100 is provided in which one or more tenants may have access to resources such as virtual machines (VMs) 114. One or more virtual machines 114 may be hosted by a host 110 connected to a virtual network 130. A tenant serviced by a VM may have subscribed to networking services with a QoS defined according to the provisions of an SLA. An SLA manager 124 may be in communication with a QoS module, connected to a traffic controller 120 which controls network 130. The SLA manager may be configured to manage tenants' SLAs by, for example, offering a number of service levels for throughput oriented traffic and a separate level of support for latency oriented traffic. The SLAs that are supported may be set according to the bandwidth resources of the network 130 and to the QoS requirements of the different tenants.

A network manager module 132 may be provided to communicate with QoS module 126 to provide an abstraction of the QoS capacities of the underlying network infrastructure (e.g., bandwidth resources, number of service levels supported by the forwarding devices, QoS capacities of the devices, etc.). The QoS module 126 may receive from the SLA manager the parameters of the QOS required for a traffic profile by the different tenants. The QoS module receives also the QoS capacities of the infrastructure from the network manager. Given those inputs, it computes the specific SLAs that can be supported, to maximize the revenue from SLAs, while minimizing the usage of network resources.

The QoS module may be connected to the VM placement manager module 140 which computes a network-aware optimal placement with respect to the network QoS requirements, as well as with respect to the topology and resources of the infrastructure, with the same goal of maximizing the revenue from SLAs that may be supported, while minimizing the usage of network resources. The VM placement manager 140 performs the final placement decisions following input from the different placement advisors (in a general system, comprising of compute/storage/network capacities, placement is performed following constraints and requirements with respect to compute/storage/network aspects).

The controller module 120 may receive from the QoS module 126 the final QoS parameters of the SLAs supported by the system for a traffic profile and a virtual network. The different SLAs may be translated to configuration instructions, both for the virtual switches as well as for the physical switches (such a translation can be performed by the QoS module before being communicated to the controller). QoS instructions for the virtual switches will comprise of traffic shaping parameters communicated to the virtual switches when initiating control queries for new traffic flows, as provided in further detail later below.

Configuration instructions of the physical switches may be represented by access control list (ACL) filters and metering information (e.g., committed rate, burst size, etc.) associated with an ACL. These instructions allow the control of the data traffic associated with a certain QoS traffic profile. As provided in further detail below, ACLs may be used to classify data packets at the physical switch level in network 130. ACL configuration may be stored in a forwarding table of the physical switch device. A data packet that matches an ACL entry (e.g., based on the packet headers) may be processed according to QoS instructions or operations defined by the ACL.

In one embodiment, an ACL may be associated with two values defining a committed transmission rate and a burst rate, the combination of which identifies whether the data packet is being or may be transmitted at a certain (e.g., a threshold) rate. The parameters, defining the threshold rate, may be set according to the SLA for a traffic profile and allows for a physical switch in the path of the data packet to monitor the rate of transmission and determine if the data packet is being transmitted within the threshold (in-profile) or is transmitted over the threshold (out-of-profile), as provided in further detail below.

Referring back to FIG. 1, the network controller 120 may be connected to network 130 to control traffic communicated over the physical infrastructure of network 130 by programming' physical switches 138 with the different ACLs and set of actions to be performed for the corresponding traffic, and by controlling the traffic originated from the virtual switches. The monitoring collector and analyzer module 134 may collect rate statistics from active connections and communicate them to the controller (potentially via the QoS module). The controller controls the connectivity service supported for a virtual network and send QoS control information (e.g., traffic shaping parameters etc.) to one or more virtual switches 112, in response to receiving a connection request from virtual switch 112. The traffic shaping parameters are calculated with respect to the supported SLAs and the monitoring statistics, as will be explained below. A virtual switch 112 may be present at a host 112 on which one or more VMs 114 are hosted. Virtual switch 112 may be configured to perform the correct setting of data packet overlay headers, as well as perform correct traffic shaping for a hosted VM, following control communication with the traffic controller 120.

Accordingly, one or more VMs 114 may be allocated to a tenant in the multi-tenant operating environment 100, where VMs with similar characteristics or functions may logically be grouped together based on a definable relationship (e.g., in sets of policy groups). SLAs may be defined for individual, pairs or groups of VMs 114. As such, an SLA may define the QoS for a VM, a pair of VMs, a group of VMs or a pair of groups of VMs. The QoS may be defined based on bandwidth allocation (i.e., setting a maximum throughput or guaranteeing a pre-defined throughput) or based on latency (i.e., setting a minimum response time). Accordingly, a VM 114 that services requests submitted by an application associated with a tenant may have multiple profiles. For example, a VM profile may be set to apply to the VM directly, a group profile may be set to apply to the same VM as a part of a group, and a pair-wise profile may apply to the same VM as a part of a VM pair.

An application running on VM 114 which is placed in host 110 may submit a data transmission request. To service the request, the responsible virtual switch in host 110 may generate a data transmission control request to a traffic controller module 120 to transfer data from a source virtual endpoint (VM 114) to a destination virtual endpoint. The request may be associated with several parameters including a virtual network ID (VNID), source and destination VM IDs (virtual IPs), group to which the source node belongs (G1), group to which the destination node belongs (G2), and an identifier (e.g., a differentiated service code point or DSCP value) which indicates the class of service (or service level) associated with the type of data or traffic that is to be transmitted, in response to the request. Depending on implementation, multiple service levels may be defined with some classes having priority over the others.

By way of example, a first service level (e.g., a Premium class of service) may be associated with type of data or traffic that is time-sensitive. For traffic associated with the first service, the QoS may be assigned based on latency. As such, to prioritize processing of data packets associated with the first class of service, the corresponding data packets may be queued in a first queue, for example, and the data packets in the first queue may be processed immediately or within a defined minimum response time. In one implementation, traffic queued in the first queue may be transmitted ahead of other queues or more frequently than other queues, and it's dropping probability may be lower than for all the other queues.

A second service level (e.g., Platinum class) may be associated with type of data traffic that is throughput-sensitive, and not necessarily time-sensitive, and has a high priority, because the corresponding SLA defines the QoS as of higher importance. Traffic associated with a second service level may be queued in a second queue by the forwarding devices and given a bandwidth allocation that is not unlimited but is set at a second level maximum threshold, or is guaranteed a specified bandwidth value. The second level maximum threshold may define the allowable transmission rate (or bandwidth) or the guaranteed rate for second service level data traffic. If the second level allowable transmission rate is exceeded, then the data may be transmitted based on a best effort policy (i.e., the QoS will no longer be met until the transmission rate drops below the defined threshold). In one embodiment, this is the highest traffic class for bandwidth, as opposed to latency.

A third service level (e.g., Gold class) may be associated with a similar type of traffic as that of second service level, but with a lower level of importance. Data packets associated with the third service level may be queued by in a proper queue in the forwarding devices, according to the QoS associated with the third service level. For example, the frequency of serving this queue might be lower than for the second service level data (and its dropping probability may be higher) to allow second service level data have a higher transmission priority over third service level data. A lower level of service (e.g., Silver, Bronze, etc.) may be associated with lower priority traffic, for example.

After establishing SLAs for different traffic profiles for different tenants, the traffic controller 120 may set the proper QoS parameters in one or more databases to indicate the aggregated traffic limit of a data traffic profile as well as the overall bandwidth connection limit of the VMs in a policy group. The one or more databases may be implemented as lookup tables—see, for example, FIGS. 4A and 4B discussed in further detail below, respectively illustrating table entries that include QoS parameters and the policy groups to which a VM belongs, where the QoS profiles are associated with one or more policy groups and different VMs in the network.

Based on the entries in the databases (or tables), and on the respective profile associated with the traffic, a data packet transmitted over the network 130 may be embedded with a class of service indicator. This indicator, hereafter referred to as a DSCP value, by way of example and without limitation, may be included in a header portion of the packet (e.g., in the L3 header). The service level to which the traffic belongs (Gold/Silver/Bronze, etc.) may be set at tenant level, according to the service that is to be provided to the application with which the traffic is associated.

Figure 2:
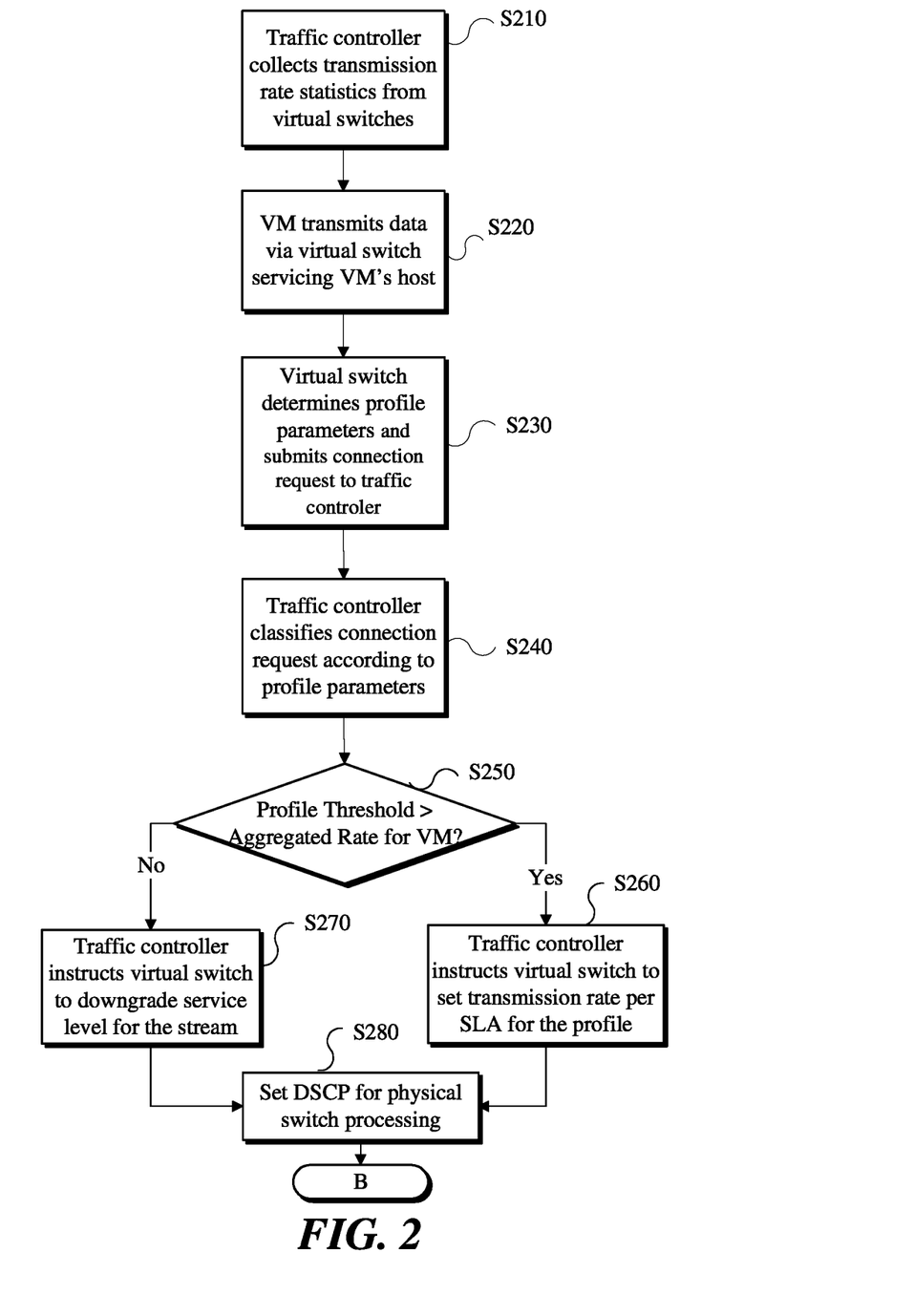
FIG. 2 is a flow diagram of an exemplary method for controlling data traffic flow in a multi-tenant communications network at the host level, in accordance with one embodiment.

Referring to FIGS. 1 and 2, the monitoring collector and analyzer module 134 may collect transmission rate statistics from one or more virtual switches 112 communicating with network 130 (S210). The collected information may be used by traffic controller 120 to set traffic shaping policies for data traffic transmitted over network 130, for example. A VM 114 operating on host 110 may transmit a data packet via a virtual switch 112 that services data communicated by host 110 (S220). The virtual switch 112 may determine traffic profile parameters associated with the data packet (e.g., according to the information recorded in the tables associated with the group to which the VM belongs) and initiate a connection request to the traffic controller 120 (S230). The submission of the connection request causes traffic profile parameters of the packet to be provided to the traffic controller 120.

In one implementation, traffic controller 120 classifies the connection request according to the data packet's profile parameters (S240). As noted earlier, traffic controller 120 may continuously collect statistics for active connections (e.g., outgoing or incoming data transmission rates) in network 130 through the monitoring collector module, and update the current aggregated rates of traffic profiles and VMs connections. Sampling methods and statistical analysis may be applied, in one embodiment, to trim the amount of the collected information and speed up the corresponding computations. Depending on implementation, profile parameters associated with a data packet or a connection over which the data packet is to be transmitted may be identified by the following: (VN, SN, DN, $G_1$, $G_2$, DSCP), where:
- ❖ VN=virtual network ID;
- ❖ SN, DN=Source and destination nodes (e.g., virtual VM IPs);
- ❖ G1=policy group to which the source node or the VM initiating the data transmission belongs;
- ❖ G2=policy group to which the destination node or the VM receiving the data transmission belongs;
- ❖ DSCP=defines QoS or service level for the connection or the data packet (e.g., Premium, Platinum, Gold, Silver, etc.).

According to traffic controller's analysis of the current aggregated traffic bandwidth for a traffic profile coming from a VM 114, traffic controller 120 determines whether the data packet or data stream for which a connection request is submitted may be transmitted to physical switch 138 for transmission over network 130, and if so at what rate. For example, in a scenario where a traffic profile is associated with a threshold transmission rate, traffic controller 120 may determine whether the current aggregated transmission rate for the particular traffic has reached the allowed threshold rate (S250). If the aggregated transmission rate is below the threshold rate, then traffic controller 120 may calculate a maximal transmission rate for the particular stream.

The maximal transmission rate may be calculated by, for example, subtracting the aggregated transmission rate for the particular traffic profile from the threshold rate for that profile. Traffic controller, in one embodiment, may send a reply to virtual switch 112 with the maximal rate allowed, taking into account the current aggregated transmission rate, the maximum aggregate threshold rate assigned to the respective traffic profile, and the connection rate limit of the VM. If the aggregated threshold rate corresponding to the respective traffic profile is greater than the current aggregated traffic rate of the traffic matching the same profile, traffic controller 120 may instruct virtual switch 112 to set the maximum transmission rate for the data stream based on the residual rate allowed for that traffic profile according to its SLA (S260). Residual rate is the difference between threshold and current aggregated rate of the profile.

It is noteworthy that in some embodiments, while a VM may belong to one or more QoS profiles, the VM may have a defined connection rate limit beyond which the VM may not be allowed to transmit data. Thus, in one example embodiment, in addition to the above, it may be determined whether the overall transmission rate of the VM is less than the VM's connection rate limit before the respective data packets submitted by the VM are submitted for processing. In one embodiment, if the VM belongs to several profiles, then the lowest allowed rate is the rate that is taken into account for the purpose of determining the transmission rate for the VM's packets. The lowest allowed rate may be calculated as the rate that is equal to the minimum residual profile rate, which is the rate that is taken into account for the purpose of determining the transmission rate for the VM's packets. Note that one of the profiles is also the allowed connection rate of the VM itself. In this manner, traffic shaping is active and is performed according to the traffic shaping parameters that were received from the traffic controller 120 as a response to the request submitted by the VM 114.

The above setting may be maintained as long as the overall data transmission bandwidth for the data stream generated by VM 112 does not violate the data transmission rate limit set for the connection established by the VM. In a scenario where the aggregated transmission bandwidth for the data stream generated by VM 112 is greater than the threshold data transmission rate associated with the traffic profile of the traffic generated by VM 112, the packet can be downgraded accordingly (S270). Thus, for example, if the service level for the traffic profile is Platinum, then the service level for the data stream may be downgraded to Gold, until the aggregated traffic rate for the data stream subsides to under the threshold rate for that traffic profile. The downgrade to Gold is performed by the virtual switch 112, following proper instructions from the controller. This can be done by updating the DSCP field of the packet accordingly.

In one embodiment, the DSCP value for the data packets being transmitted may be copied to the overlay L3 header to enable processing at physical switch 138 (S280), as provided in further detail below. Optionally, statistics with respect to outgoing and incoming rates of one or more connections may be transferred from the virtual switch 112 and the physical switches to the traffic controller 120 via the monitoring collector module, to provide an estimation of the current transmission rate over multiple connections to network 130. In one embodiment, if the rate limit of the traffic profile is beyond the threshold rate, traffic is classified as best effort (e.g., DSCP=DF/CS0 or 802.1p priority=0, see Table 1 below).

TABLE 1

| Service Level | Default PHB (DSCP) | 802.1p Priority |
|---|---|---|
| Critical | CS7 | 7 |
| Network Control | CS6 | 6 |
| Premium | EF, CS5 | 5 |
| Platinum | AF41, AF42, AF43, CS4 | 4 |
| Gold | AF31, AF32, AF33, CS3 | 3 |
| Silver | AF21, AF22, AF23, CS2 | 2 |
| Bronze | AF11, AF12, AF13, CS1 | 1 |
| Standard | DF, CS0 | 0 |

It is noteworthy that the traffic shaping operations illustrated in FIG. 2 and discussed above are performed in a first phase by virtual switch 112 at the host level in cooperation with the traffic controller 120 for the purpose of controlling flow of data traffic over a connection established with network 130 by a VM running on a host 114. In the following, with reference to FIG. 3, we discuss traffic shaping operations performed by the underlying network infrastructure (e.g., by a physical switch 138) to control traffic bandwidth, optionally, at a packet-by-packet level, in a second phase.

Accordingly, in an exemplary implementation, using the functionality disclosed in FIG. 2, traffic from a VM in G1 to a VM in G2 may be transferred, if the two following conditions are met: (1) the overall outgoing rate of a VM in G is less than the allowed connection rate limit, and (2) the aggregated traffic between G1 and G2 does not exceed the respective limit defined (G1 and G2 may be the same group in case of inner group limit). In an example embodiment, a profiles database may be implemented, where QoS profiles are defined in the profiles data base.

Figure 4A:
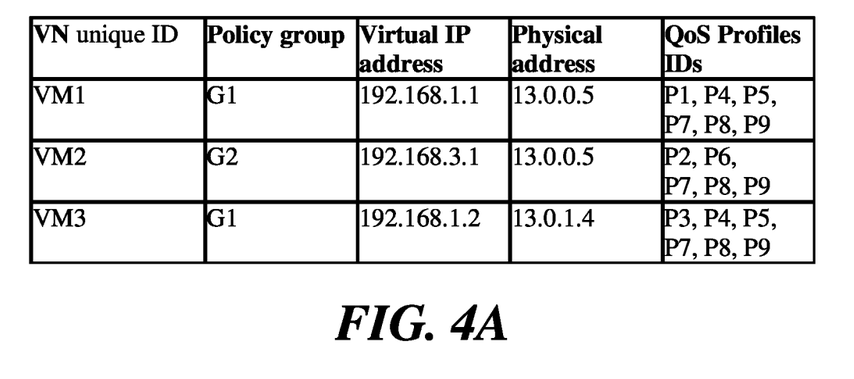
FIG. 4A shows an example table that include entries for a VM in a virtual network and the respective policy groups to which the VM belongs as well as the QoS profiles associated with the policy groups, in accordance with one or more embodiments.
Figure 4B:
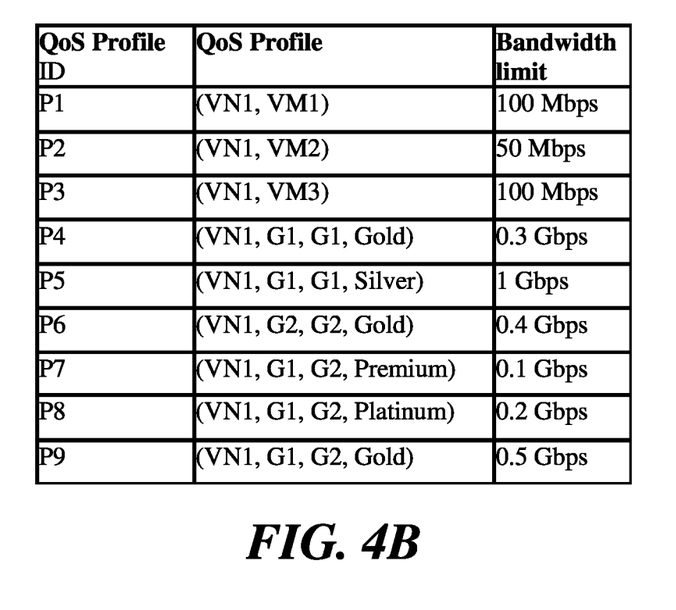
FIG. 4B shows another example table that includes entries for the QoS profiles in the virtual network, in accordance with one or more embodiments.

Referring to FIGS. 4A and 4B, the first table, includes QoS parameters for a VM in a network VN1 and the policy groups (e.g., G1, G2, G3) in VN1. The QoS profiles associated with the policy groups (e.g., P1, P2, . . . , P9) are also defined. In the second table, entries for the QoS in VN1 are shown. For the purpose of example, consider a virtual machine VM1 which belongs to policy group G1 in a virtual network VN1. The following example shows the relevant profiles for VM1 in the database:

P1. (VN1, VM1)=100 Mbps (connection rate limit of VM1)
P4. (VN1, G1, G1, Gold)=0.3 Gbps (aggregated rate limit for Gold class within group G1)
P5. (VN1, G1, G1, Silver)=1 Gbps (aggregated rate limit for Silver class within group G1)
P7. (VN1, G1, G2, Premium)=0.1 Gbps (aggregated pair-wise group limit between G1 and G2, for Premium class)
P8. (VN1, G1, G2, Platinum)=0.2 Gbps (aggregated pair-wise group limit between G1 and G2, for Platinum class)
P9. (VN1, G1, G2, Gold)=0.5 Gbps (aggregated pair-wise group limit between G1 and G2, for Gold class)

In the above scenario, consider VM1 in G1 that wants to transmit data to a second VM in G2, where the data is classified as Platinum traffic class. Profiles P7, P8, P9 above would be relevant to determining the maximum bandwidth that may be allowed, according to the requested service class. In case VM1 wants to send data to a second VM in G1, then profiles P4, P5 above would be relevant to determining the maximum bandwidth that may be allowed, according to the requested service class.

The total outgoing rate of a VM is constrained to be at most its connection rate limit. Profile P1 determines this limit for VM1. For example, let us assume that the current outgoing rate of data for the first VM reached 100 Mbps. If so, then the first VM is not allowed to send any more data packets, due to the VM's connection rate limit having been exhausted at the time. If, however, the current outgoing rate for the first VM is 50 Mbps, for example, then the first VM would be allowed to send additional traffic at 50 Mbps, for example.

As shown in FIGS. 4A and 4B, in one implementation, a list of VM profiles may be included in one or more data structures (e.g., lookup tables, a databases, etc.) with one data structure (e.g., table) that includes the identification parameters of the VMs (e.g. unique IDs, Policy group, Virtual & Physical addresses). For example, the data structure may be organized as shown in FIG. 4A such that under a specific VN the corresponding VMs are listed and, for example, from a VM in the list one or more pointers refer to entries in the profile table that includes the particular VM. Optionally, there may be a separate VMs table and QoS profiles table for each VN, for example, as illustrated.

With respect to bandwidth limit, a tenant may require respective values for the set of bandwidth limits defined above (that is, pairwise group limit, inner group limit, connection rate limit). In addition, a value may be sliced into several classes (e.g., "Platinum", "Gold" or "Silver"). For example, the aggregated inner group bandwidth of G may be defined as 2 Gbps, out of which ½ Gbps may be classified as platinum, ½ as gold and the rest as silver. Each class may be provided a different level of bandwidth guarantee, where the Platinum class, for example, may guarantee that the respective amount of bandwidth will be reserved and always available, while gold and silver are based on over-commitment of resources, and prioritize traffic accordingly, where for example, Platinum class traffic has priority over Gold class traffic, and Gold class traffic over Silver class traffic.

For latency-oriented traffic at tenant level, latency-oriented SLAs may be defined both within a single policy group as well as between policy groups. A latency-oriented SLA may be defined by setting the following limits and guarantees. For a group G, a minimal latency (depending on underlying infrastructure) may be guaranteed for some percentage of the aggregated inner group bandwidth limit. For a pair of groups (G1, G2), a minimal latency may be guaranteed for some percentage of the aggregated pair-wise groups bandwidth limit. Latency aware traffic may be defined using the "Premium" class, for example.

As such, latency and throughput QoS guarantees may be provided to the tenants as a function of the output of resource allocation and network aware placement optimization problems, taking into consideration the topology of the data center as well as the QoS requirements of the tenants.

Aggregated bandwidth limits classified as Premium or Platinum, for example, may be provided by reserving some portion of the relevant connections in a data center. The set of relevant connections may include the links where traffic corresponding to the respective bandwidth limit could possibly be transferred. For example, when considering a pairwise group bandwidth limit between G1 and G2, connection or links between VMs of G1 and G2 may be deemed relevant.

An optimized placement solution may help minimize the total amount of bandwidth reserved over the links, for example, by placing VMs with Premium or Platinum connection demands at close proximity. As noted earlier, the VN identifier as well as the source and destination policy groups of a traffic stream may be placed in the overlay headers depending on the overlay method used (e.g., VXLAN, NVGRE, STT, etc.). The enforcement of the Premium or Platinum SLAs, guaranteeing that a pre-defined bandwidth value is always available for these profiles, may be performed at a physical switch 138 within the underlying infrastructure as provided in further detail below with reference to FIG. 3, where the operations illustrated in FIG. 3 are implemented to shape traffic already processed by the virtual switch 112.

Figure 3:
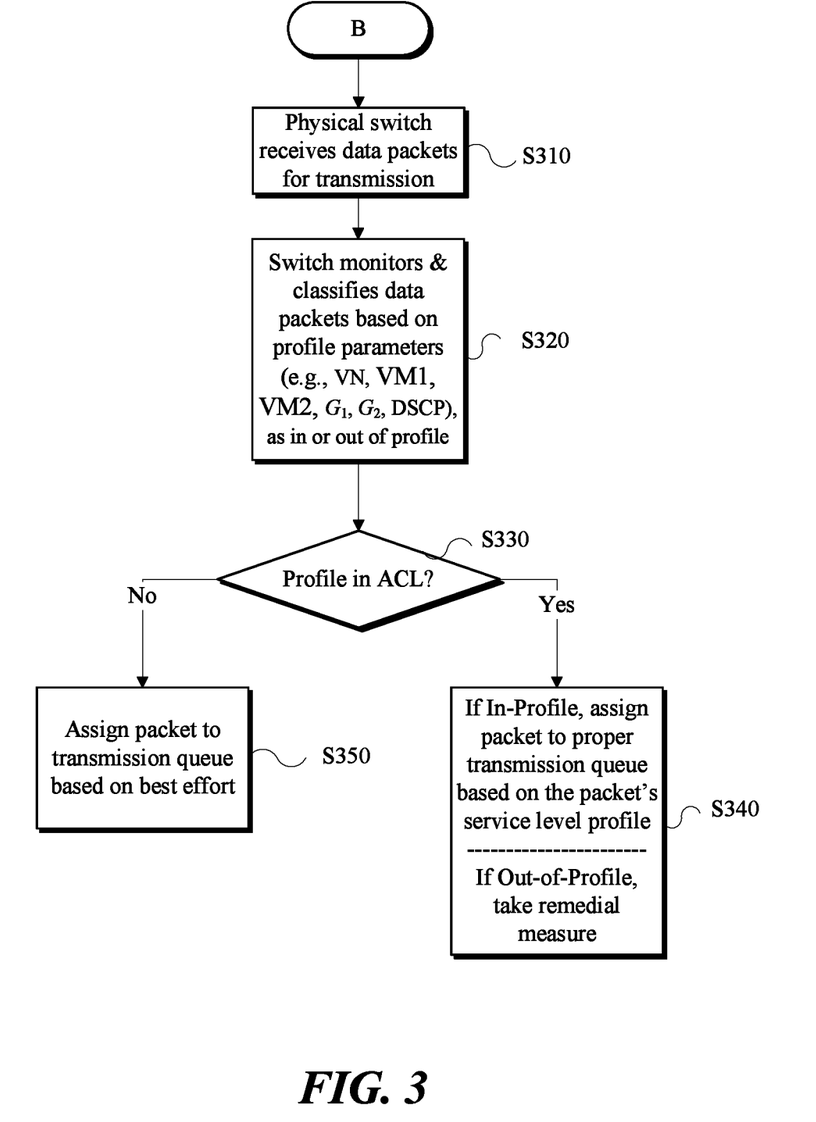
FIG. 3 is a flow diagram of an exemplary method for controlling data traffic flow in a multi-tenant communications network at the physical switch level, in accordance with one embodiment.

Referring to FIG. 3, after data traffic generated by VMs 114 is processed by virtual switch 112, the corresponding data packets with profile parameters (e.g., VN, VM1, VM2, $G_1$, $G_2$, DSCP) embedded in the packets header, for example, arrive at the ingress port of a physical switch 138 (S310). Physical switch 138 may be configured to monitor and classify data packets using ACLs based on the profile parameters embedded in the data packets (S320).

In one embodiment, an ACL may be associated with two values defining a committed transmission rate and a burst rate, the combination of which identifies whether the data packet is being or may be transmitted at a certain rate (e.g., a threshold rate). The parameters, defining the threshold rate, may be set according to the SLA for a traffic profile and allows for a physical switch in the path of the data packet to monitor the rate of transmission and determine if the data packet is being transmitted within the threshold (in-profile) or is transmitted over the threshold (out-of-profile), as provided in further detail below. An ACL may be associated with a QoS meter that determines whether data packets matching the ACL are in-profile or out-of-profile (S330). A data packet may be determined as in-profile, if the traffic stream matching the respective fields adheres to the committed rate (as well as possible burst size) set for the respective ACL.

For an ACL meter, the committed rate (and possible burst size) may be set according to, for example, latency-aware (e.g., Premium) or throughput-aware (e.g., Platinum) SLAs of the respective traffic profile. As an example, the Premium and Platinum SLAs may be enforced by different ACLs and distinguished by the DSCP field as provided in Table 1 above. In a scenario where a data packet is classified as in-profile, the data packet may be assigned to a proper transmission queue based on the packets service level profile (S340). Premium traffic may be treated according to, for example, expedited forwarding (EF) per hop behavior (PHB), which has the highest egress priority and lowest drop precedence level. EF traffic may be forwarded ahead of all other traffic. Platinum traffic may be assigned to the next level priority queue, for example.

If the data packet is classified as out-of profile, then remedial measures may be taken to manage the transmission of the respective data packets (S340). For example, the DSCP for the data packet may be re-marked to the value representing a lower service class (e.g., from Platinum to Gold). It is noteworthy that if traffic shaping performed at the host level is performed correctly, cases where traffic is classified as out-of-profile should not be common. Assuming the network switching infrastructure is dedicated to the virtual networks management, traffic that is not classified as a recognized ACL profile, but is marked as Premium or Platinum, for example, may be remarked to best effort and the corresponding data packets may be assigned to a transmission queue for best effort processing (S350).

The transmission queue assignment may be optimized by adding ACLs at the bottom of the list, with matching profile parameters corresponding to the DSCP field, so as to "catch" Premium/Platinum packets with unrecognized profile. In this manner, Premium or Platinum traffic may match these ACLs if the corresponding data packets were not classified by any previous ACLs (that is, their profile was not recognized), and if so, then the DSCP field for the data packet may be remarked to best effort.

Given a proper configuration of the underlying infrastructure, dynamic changes within the system may not require a complete reconfiguration of the infrastructure. For example, cases of migration, initialization, or deletion of VMs within parts of the network may not require the use of new links by existing traffic profiles. If so, then no reconfiguration may need to be performed. Dynamic changes that require a reconfiguration may be weighted and considered accordingly by the module performing placement decisions.

In one embodiment, network control traffic data packets may be separated into an exclusive traffic class and provided with reserved bandwidth or otherwise network control traffic may be assigned some fraction of the bandwidth of each link and marked accordingly (e.g., Critical/Network Control) by way of the respective DSCP or 802.1p values, for example (See Table 1). Such service levels may be restricted for network control traffic use. In the following, for the purpose of illustration and without limitation, a simplified example is provided to help better understand the general nature of the concepts and ideas disclosed above. Accordingly, the specific details or features of this simplified example should not be construed as limiting the scope of the claimed subject matter here to such details or features.

Referring to FIGS. 1 through 3, consider an example communications network 130, which has an aggregated rate limit of 10 Mbps between VMs in groups G1 and G2, where a VM in G1 has a connection rate limit of 1 Mbps. Further, assume the aggregated rate limit between G1 and G2 is divided as 2 Mbps for Platinum traffic and 4 Mbps each for Gold and Silver. If a data packet classified as Platinum is transmitted from VM1 in G1 to VM2 in G2, then virtual switch 112 submits a request to the traffic controller 120 with profile VN1, VM1, VM2, G1, G2, Platinum (S220-S230).

When processing the request, the traffic controller 120 determines if the aggregated Platinum traffic between the groups G1 and G2 doesn't exceed the permitted maximum threshold of 2 Mps, and if the outgoing data traffic rate of the VM1 doesn't exceed the 1 Mbps maximum threshold define for the VM profile (S250). If so, the allowed transmission rate for the data packet is set to the maximum allowed and the packet will be transmitted (S260). Then, the data packet is passed to the physical switch 138 to determine whether the data packet is in profile or not.

In the above example, if the aggregated rate limit for the data packet of a certain profile is exceeded (e.g., S250), then the data packet may be downgraded to best effort (S270). If the rate connection limit of the VM is exceeded, the data packet may even be dropped, in one embodiment. The same processing approach may be applied for data traffic classified as Silver or Gold, except in some embodiments, such classes of traffic may not be matched against an ACL, and may be transmitted As-Is since the corresponding DSCP is not of Platinum or Premium class, for example. Such classes are managed based on over-commitment, rather than bandwidth reservation. Platinum and Premium classes, which are based on bandwidth reservation, are thus also enforced by the physical switches, by means of ACLs.

It is noteworthy that in the above example the bandwidth limit between the groups G1 and G2 in the virtual network VN1 is 10 Mbps. Within this network, other bandwidth limits may be set between other pairs of groups, and these limits may be further divided between different traffic classes (e.g., Platinum, Gold, etc.).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 5A:
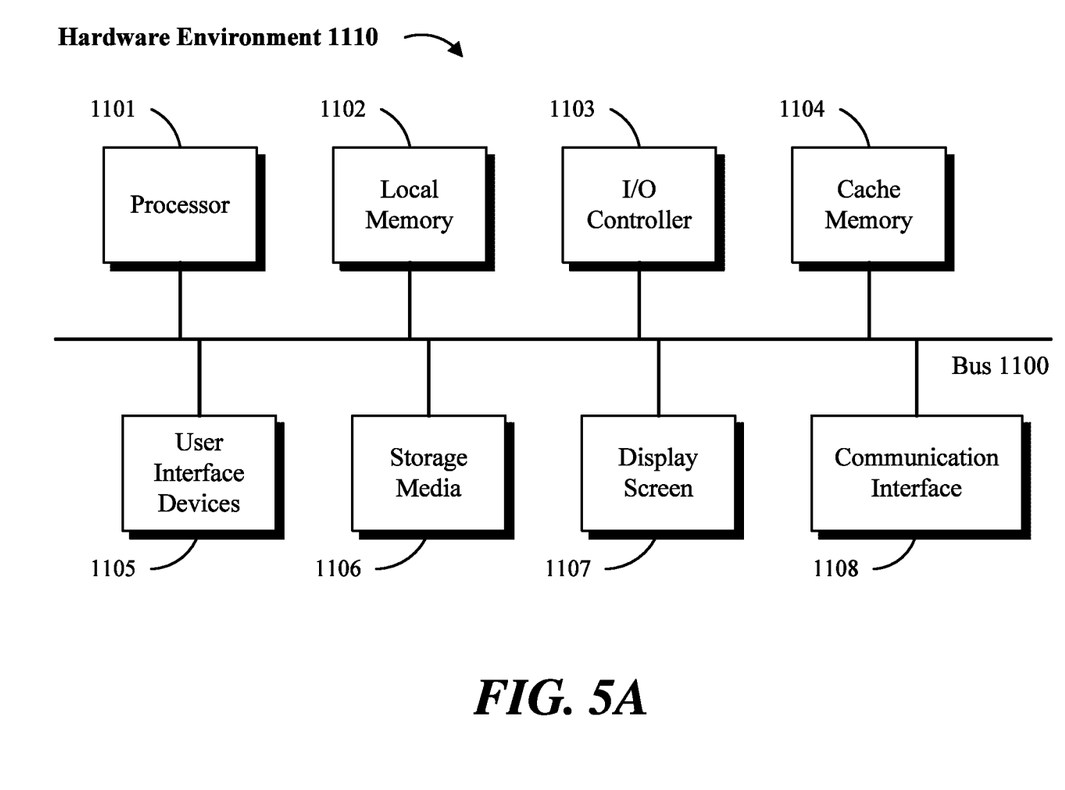
FIGS. 5A and 5B are block diagrams of hardware and software environments in which the disclosed systems and methods may operate, in accordance with one or more embodiments.
Figure 5B:
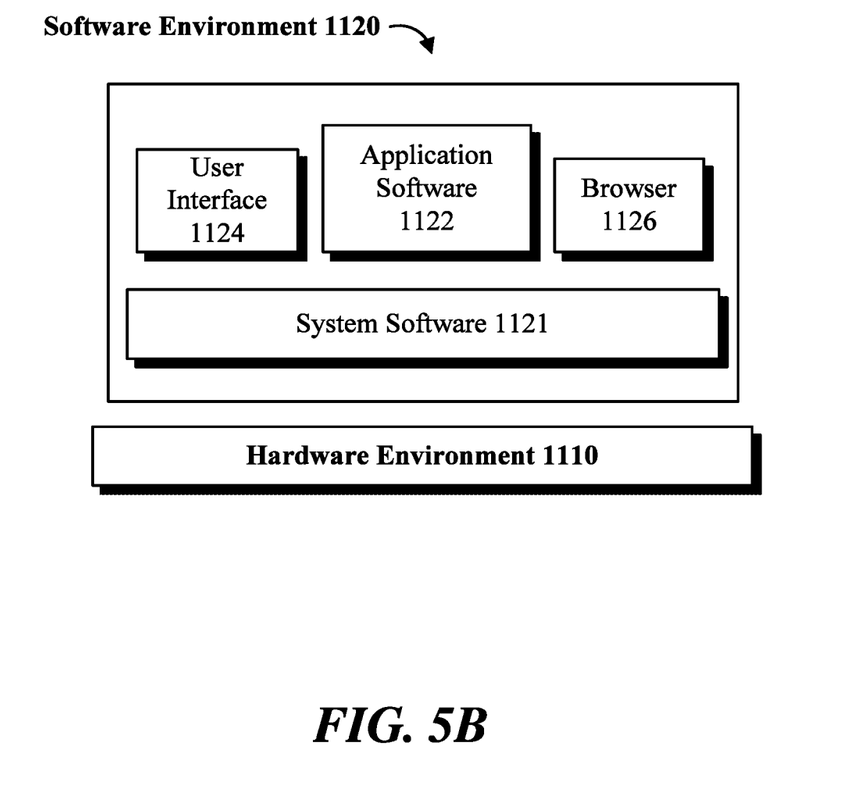

Referring to FIGS. 5A and 5B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 5A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method of enforcing a service level agreement (SLA) in a multi-tenant communications network, the method comprising:
    assigning a first QoS level to a first communication initiated by a VM belonging to at least a first group, wherein a connection request is submitted by a virtual switch to a traffic controller to assist in establishing the first communication,
    wherein a first SLA associated with the first communication defines acceptable throughput and latency metrics for the first communication based on profile parameters associated with the communication, wherein the first SLA further defines a throughput metric comprising aggregated data transmission rate between a first VM belonging to a first policy group and a second VM belonging to a second policy group, and wherein the first SLA further defines a latency metric for a category of data communication associated with a first VM in a first group and a second VM in a second group, and
    wherein the traffic controller determines whether the connection request can be submitted from the virtual switch to a physical switch based upon an overall transmission rate of the VM as against a corresponding connection rate limit for the VM.

2. The method of claim 1, wherein the first SLA further defines a throughput metric comprising aggregated outgoing connectivity rate for the VM.

3. The method of claim 1, wherein the first SLA further defines a throughput metric comprising aggregated data transmission rate for overall traffic within a first policy group to which the VM belongs.

4. The method of claim 1, wherein the first SLA further defines a latency metrics that is enforced over traffic based on a strict reservation of bandwidth over potential paths between a first VM in a first group and a second VM in a second group.

5. The method of claim 1, wherein the first SLA defines a throughput metrics that is enforced based on over-provisioning of resources and traffic shaping performed by virtual switches following instructions from a controller and setting of a service class field within a packet header of the first communication.

6. The method of claim 1, wherein the first SLA defines a throughput metric and a latency metric that is enforced by provisioning of guaranteed resources and enforcement by an underlying switching infrastructure.

7. The method of claim 6 wherein the underlying switching infrastructure comprises one or more virtual switches that shape traffic and set a service class identifier within a packet header of the first communication.

8. The method of claim 6 wherein the underlying switching infrastructure comprises one or more physical switches that operate based on instructions issued by a centralized controller.

9. The method of claim 1, wherein the first SLA further defines a throughput metric comprising aggregated data transmission rate for overall traffic between a first policy group and a second policy group.

10. The method of claim 1, wherein the first SLA further defines at least two or more levels of delivery priorities for the first communication based on profile parameters associated with the communication.

11. A method of enforcing a service level agreement (SLA) in a multi-tenant communications network, the method comprising:
    assigning a first QoS level to a first communication initiated by a VM belonging to at least a first group, wherein a connection request is submitted by a virtual switch to a traffic controller to assist in establishing the first communication,
    wherein a first SLA associated with the first communication defines acceptable throughput and latency metrics for the first communication based on profile parameters associated with the communication, wherein the first SLA further defines a throughput metric comprising aggregated data transmission rate between a first VM belonging to a first policy group and a second VM belonging to a second policy group, and wherein the first SLA further defines a latency metric for a category of data communication associated with a first VM in a first group and a second VM in a second group; and
    wherein the traffic controller determines whether the connection request can be submitted from the virtual switch to a physical switch.

12. The method of claim 11, wherein the first SLA further defines a throughput metric comprising aggregated outgoing connectivity rate for the VM.

13. The method of claim 11, wherein the first SLA defines a throughput metric and a latency metric that is enforced by provisioning of guaranteed resources and enforcement by an underlying switching infrastructure.

14. The method of claim 13 wherein the underlying switching infrastructure comprises one or more virtual switches that shape traffic and set a service class identifier within a packet header of the first communication.

15. The method of claim 13 wherein the underlying switching infrastructure comprises one or more physical switches that operate based on instructions issued by a centralized controller.

16. A computer program product comprising a computer readable storage medium having a computer readable program, wherein the computer readable program when executed on a computer causes the computer to:
    assign a first QoS level to a first communication initiated by a VM belonging to at least a first group, wherein a connection request is submitted by a virtual switch to a traffic controller to assist in establishing the first communication, wherein the VM belongs to a plurality of QoS profiles, wherein a first SLA associated with the first communication defines acceptable throughput and latency metrics for the first communication based on profile parameters associated with the communication, wherein the first SLA further defines a throughput metric comprising aggregated data transmission rate between a first VM belonging to a first policy group and a second VM belonging to a second policy group, wherein the first SLA further defines a latency metric for a category of data communication associated with a first VM in a first group and a second VM in a second group, and wherein the traffic controller determines whether the connection request can be submitted from the virtual switch to a physical switch based upon an overall transmission rate of the VM as against a corresponding connection rate limit for the VM.

17. The computer program product of claim 16 wherein the first SLA further defines at least two or more levels of delivery priorities for the first communication based on profile parameters associated with the communication.

18. The computer program product of claim 17 wherein the first SLA defines a throughput metric and a latency metric that is enforced by provisioning of guaranteed resources and enforcement by an underlying switching infrastructure, and wherein the underlying switching infrastructure comprises one or more virtual switches that shape traffic and set a service class identifier within a packet header of the first communication.

* * * * *